United States Patent [19]

Drozdowski

[11] Patent Number: 5,657,718
[45] Date of Patent: Aug. 19, 1997

[54] METHOD OF FEEDING FISH

[75] Inventor: Don D. Drozdowski, Clinton Township, Mich.

[73] Assignee: Elfstar, L.L.C., Fraser, Mich.

[21] Appl. No.: 518,488

[22] Filed: Aug. 23, 1995

[51] Int. Cl.$^6$ ................................................ A01K 61/02
[52] U.S. Cl. ................................................ 119/230
[58] Field of Search ............................. 119/215, 230, 119/174, 900, 905; 604/187, 192, 117

[56] References Cited

U.S. PATENT DOCUMENTS

| | | | |
|---|---|---|---|
| 3,313,301 | 4/1967 | Jefferts et al. | |
| 4,282,828 | 8/1981 | Johnson. | |
| 4,373,526 | 2/1983 | Kling | 604/17 |
| 4,708,090 | 11/1987 | Molaub et al. | |
| 5,141,496 | 8/1992 | Dalto et al. | 604/117 |
| 5,201,717 | 4/1993 | Wyatt et al. | 604/192 |
| 5,531,691 | 7/1996 | Shonfeld et al. | 604/187 X |

*Primary Examiner*—Thomas Price
*Attorney, Agent, or Firm*—Young & Basile, P.C.

[57] ABSTRACT

A method and apparatus for administering a fluid solution to an individual fish, wherein the fish is placed in a feeder apparatus connected to a metering device. The metering device stores a quantity of the solution. The feeder apparatus includes a hooded cavity for placement of the head of a fish and a calibrated adapter for placement into the mouth of the fish. The calibrated adapter has a throughbore communicating to the stored quantity of solution in the metering device so that triggering the metering device expels the fluid directly into the mouth of the fish.

10 Claims, 1 Drawing Sheet

METHOD OF FEEDING FISH

FIELD OF THE INVENTION

The present invention relates to a method and apparatus for feeding and administering medication to fish.

BACKGROUND OF THE INVENTION

Each year the industry of raising tropical fish increases as more and more people discover the pleasures of keeping tropical fish. There is a pleasure and calming effect of watching the brilliant patterns formed by the movement of the fish in their aquarium. As a result, tropical fish are used as pleasant and fascinating decor in the home, hotel foyers, doctor's and dentist's waiting rooms, and in hospital therapy.

The cost of attaining and breeding tropical fish can be very expensive. Therefore, for the tropical fish breeder, it is imperative to prevent disease to the fish. Although it is obviously better to adopt the principle that prevention is better than a cure when dealing with fish, immediate remedial action, such as immunization and medication have provided an opportunity to cure the fish from its illness.

One current method to administer medication to fish that are sick is to simply drop the medication in solid form into the tank. The fish, hopefully, will eat the solid particles mistaking it for food. In many cases, the fish do not eat the medication and as a result further deteriorate and die. Another method to administer medication to fish is to provide a mass vaccination in which many fish are sprayed with vaccinates so that the fish receive direct application of the medication on some portion of their body surface. For the tropical fish breeder, generally a single fish may become ill at a time. Therefore, the methods for mass immunization or distribution of medication is not warranted or advised.

A recent experimental method for administering medication for an individual fish was to remove the sick fish from the tank and inject the medication into the fish along the side of its body. This procedure has not provided a high success rate and has inflicted undue stress to the fish being vaccinated.

Therefore, it is desirable to provide a method and means for feeding or medicating an individual fish. It is further a desire to provide a means for administering liquid food or medication that minimizes stress to the fish. It is also a desire of the invention to provide a means for accurately administering a measured quantity of food or medication to the fish. Finally, it is a desire of the invention to provide a method for vaccinating a fish that eliminates waste of the medication.

SUMMARY OF THE INVENTION

The present invention addresses the aforementioned concerns. The method of the current invention is to administer liquid medication or food to the fish orally by means of a metering device such as a syringe having a hollow body for the storage of the liquid. To simplify the oral administration of the medication to the fish, a feeder apparatus is threadably attached to one end of the common syringe. The feeder apparatus includes a hooded cavity and a calibrated adapter extending from the cavity. The calibrated adapter has a throughbore communicating to the hollow body of the metering device.

Before retrieving the fish from the tank, the hollow body of the syringe is filled with a specified amount of food or medication. The feeder apparatus is threadably attached to the syringe so that the hooded cavity and calibrated adapter are facing away from the syringe. The calibrated adapter has notches along its length to facilitate breaking off portions of the adapter to accommodate a particular fish size. The calibrated adapter is appropriately sized to fit into the mouth of the fish without causing injury. The calibrated adapter regulates how far the fish's mouth can be placed into the hood.

The fish is retrieved from the tank and its head is placed within the cup-shaped hood attached at one end of the syringe. The fish is positioned so that its mouth is placed over the centrally located calibrated adapter extending from the feeder apparatus within the hood. The medication or food can then be delivered to the fish orally by actuating the syringe.

The apparatus and method of the present invention provides a number of benefits. By extending the calibrated adapter into the mouth of the fish, the entire measured quantity of fluid is administered to the fish; and waste of the fluid is virtually eliminated. Only the inflicted fish is provided medication or food, thus avoiding mass immunization to other healthy fish. In addition, the method together with the feeder device provides a quick, painless and non-stressful means of administering the medication and food to the fish.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
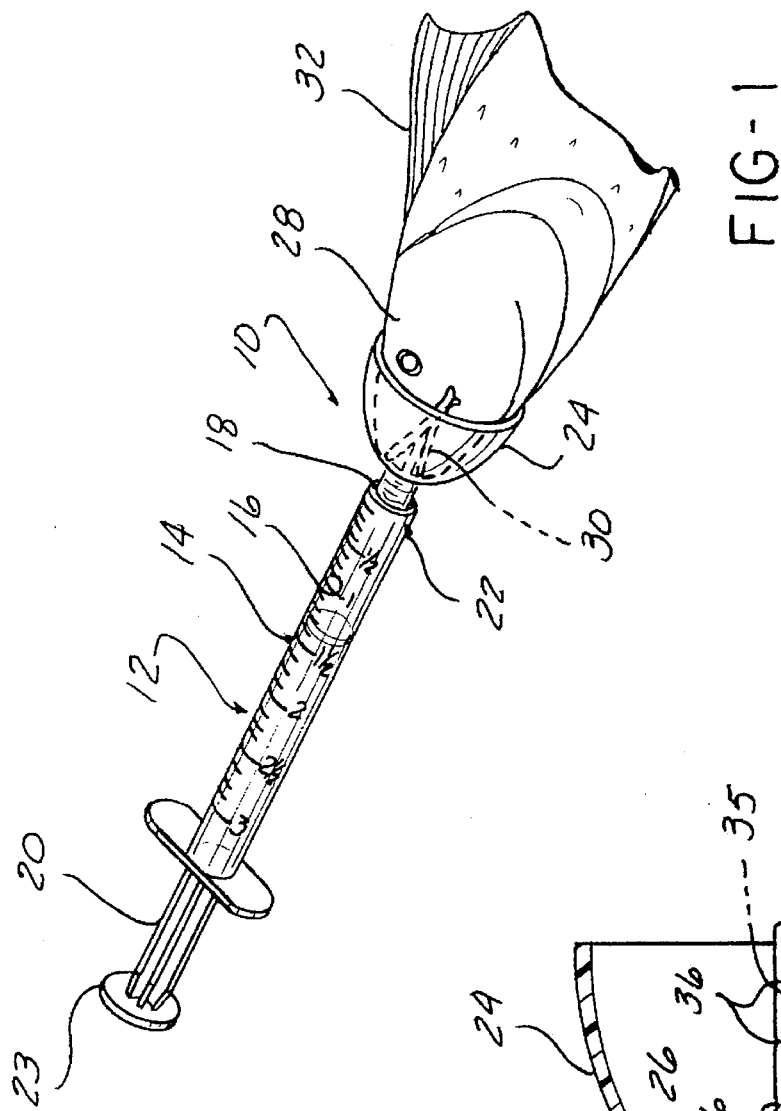
FIG. 1 is a perspective view partly in section of the feeder apparatus and metering device according to the preferred embodiment of the invention.

The method for feeding or administrating medication to a fish utilizes an apparatus generally shown in FIG. 1.

The device includes a feeder apparatus 10 selectively connected to a metering device 12. The metering device 12 is preferably a syringe 14 having a calibrated hollow body 16 with an aperture 18 at one end for installation of the feeder apparatus 10 and a slidable trigger or plunger 20 at the opposing end for selectively expelling stored fluid contained in the hollow body 16. The hollow body 16 is calibrated to mark the quantity of fluid therein. Proximate to the aperture 18 at the first end is connecting means 22 for connecting the feeder apparatus to the metering device 12. For simplicity, the connecting means is preferably a threaded inner bore 21 for threadably attaching to a threaded outer bore 25 at one end of the feeder apparatus 10. The threaded inner bore 21 is a throughbore communicating from the hollow body 16 to aperture 18.

Figure 2:
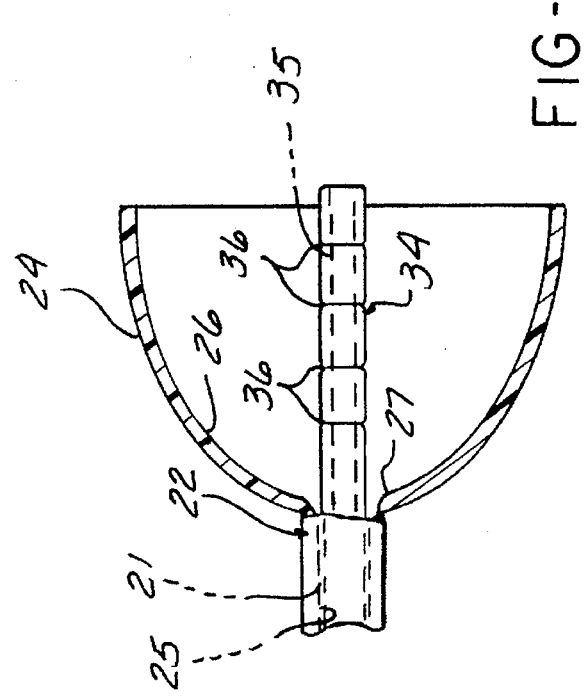
FIG. 2 is an enlarged view of the feeder apparatus showing a hooded membrane and a calibrated adapter according to the preferred embodiment of the invention.

The feeder apparatus 10 as shown connected to the metering device 12 in FIG. 1 and more clearly in FIG. 2, includes a semi-circular or semi-oval hooded membrane 24 having a cavity 26 therein contoured to receive the head 28 and mouth 30 area of a fish. The hooded membrane 24 prevents the fish 32 from further opening its jaw as the food or medication is being administered. Extending axially through the center of the hooded membrane 24 in a direction away from the metering device 12 is a calibrated adapter 34. The calibrated adapter 34 has a small bore conduit 35 passing centrally therethrough and aligning with the aperture 18 at the first end for communicating with the stored fluid contained in the hollow body 16. The calibrated adapter 34 is sized and positioned to fit in the mouth 30 of the fish 32. The calibrated adapter 34 ensures that the entire amount of liquid food or medication is expelled into the mouth 30. The calibrated adapter 34 is notched at periodic intervals along its length. The notches 36 provide an easy break-off point for sizing the adapter 34. The length of the adapter 34 can be set by breaking off a portion of the length of the adapter at a notched portion 36. The length of the adapter 34 must be sized to accommodate the subject fish 32 to prevent injury to the fish as well as ensuring that the entire amount of liquid food or medication is consumed by the fish 32.

The body 16 of the syringe 14 is filled with the liquid food or medication to the appropriate calibrated level by conventional methods. The feeder apparatus 10 is threadably connected to the syringe 14 and the length of the calibrated adapter 34 is adjusted for the specific size fish by snapping off a portion of the adapter 34 at the notch 36. Administering liquid food or medication requires that the fish 32 be manually retrieved from the tank and securely held in one hand. The fish 32 is then positioned such that its head 28 is inserted into the cavity 26 of the housing membrane 24 of the feeder apparatus 10. As the head 28 is positioned into cavity 26, the calibrated adapter 34 is inserted into the mouth 30 of fish 32. The head 28 is placed against the far inner portion 27 of the cavity 26. Once the fish is positioned in place, the plunger 20 within the syringe 12 is actuated by an inward depression at its thumb button 23. The depression forces the fluid in the hollow body 16 to be pushed through the aperture 18 and the inner bore 35 of the calibrated adapter 34. After the fluid has been administered to fish 32, the fish may be returned to its tank.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A feeding device for administering a solution to a fish comprising:

means for containing a measured amount of solution;

insertable conduit means extending from one end of the feeding device, and fluidly communicating with said containing means and configured for placement in the mouth of the fish;

means for adjusting the length of the insertable conduit means for proper depth penetration into the mouth of the fish;

means for positioning the head of the fish adjacent the containing means for preventing movement of the jaw of the fish; and means for expelling the measured amount of solution into the mouth of the fish through the insertable conduit means.

2. The feeding device of claim 1, wherein the means for expelling the measure amount of solution includes a syringe having an actuator at an end distal from the insertable conduit means.

3. The feeding device of claim 2, wherein the containing means includes a hollow body for storage of the solution located in the syringe, wherein said hollow body is disposed between the insertable conduit means and the actuator.

4. The feeding device of claim 3, wherein the means for positioning the head of the fish adjacent to the syringe includes a hooded membrane contoured to receive the head of the fish, wherein said hooded membrane is threadably attached to the syringe.

5. The feeding device of claim 4, wherein the means for adjusting the length of the insertable conduit means into the mouth of the fish includes a calibrated insertable conduit means extending from the interior of the hooded membrane, said calibrated insertable conduit means having a through-bore to the hollow body.

6. The feeding device of claim 5 wherein the calibrated insertable conduit means has an adjustable length formed by at least one notch located along the length, wherein said notch provides a break-off point for sizing the insertable conduit means.

7. The feeding device of claim 1 for administering a solution from a container to a fish according to a method comprising the steps of:

containing a measured amount of the solution;

adjusting the length of the insertable conduit means of the feeding device into the mouth of the fish wherein said insertable conduit means fluidly communicates with the containing means;

positioning the head of the fish adjacent the containing means to prevent movement of the jaw of the fish; and expelling the measured amount of solution to the fish.

8. A method for administering a solution to a fish comprising the steps of:

containing a measured amount of solution within a feeding device;

providing an insertable conduit means extending from one end of the feeding device;

adjusting the insertable conduit means of a feeding device for placement within the mouth of the fish;

positioning the head of the fish within a hooded membrane adjacent to a containing means of the feeding device, so that the jaw of the fish is prevented from moving; and expelling the measured amount of solution into the mouth of the fish through the insertable conduit means.

9. The method for administering a solution to a fish of claim 8, wherein the hooded membrane is threadably attached to the containing means.

10. The method of claim 9 further including the step of placing the adjusted insertable conduit means of the feeding device into the mouth of the fish, wherein the adjusted insertable conduit means extends from the center of the hooded membrane and has a throughbore to the containing means.

* * * * *